United States Patent
Illingworth

(12) 
(10) Patent No.: US 6,520,449 B2
(45) Date of Patent: Feb. 18, 2003

(54) LIFTING PLATFORM WITH POSITIVE HORIZONTAL STABILITY

(75) Inventor: Lewis Illingworth, Kensington, NH (US)

(73) Assignee: Vortex Holding Company, Avenel, NJ (US)

( * ) Notice: Subject to any disclaimer, the term of this patent is extended or adjusted under 35 U.S.C. 154(b) by 0 days.

(21) Appl. No.: 09/906,240

(22) Filed: Jul. 16, 2001

(65) Prior Publication Data

US 2001/0048052 A1 Dec. 6, 2001

Related U.S. Application Data

(63) Continuation-in-part of application No. 09/728,602, filed on Dec. 1, 2000, which is a continuation-in-part of application No. 09/316,318, filed on May 21, 1999.

(51) Int. Cl.[7] .............................................. B64C 23/06
(52) U.S. Cl. .................... 244/12.1; 244/23 R; 244/199; 180/116; 180/120
(58) Field of Search ............................. 244/12.1–12.6, 244/23 R–23 D, 199; 180/116–120

(56) References Cited

U.S. PATENT DOCUMENTS

| | | | | | |
|---|---|---|---|---|---|
| 2,922,277 | A | * | 1/1960 | Bertin | 244/23 R |
| 3,117,643 | A | * | 1/1964 | Cockerell | 180/116 |
| 3,170,276 | A | * | 2/1965 | Hall | 180/116 |
| 3,241,627 | A | * | 3/1966 | Hart et al. | 180/116 |
| 3,255,835 | A | * | 6/1966 | Mamo | 180/116 |
| 3,269,476 | A | * | 8/1966 | Jones | 180/116 |
| 3,460,647 | A | * | 8/1969 | Laing | 180/116 |
| 3,495,679 | A | * | 2/1970 | Cockerell | 180/116 |
| 5,803,199 | A | * | 9/1998 | Walter | 180/120 |

* cited by examiner

Primary Examiner—Galen L. Barefoot
(74) Attorney, Agent, or Firm—Ward & Olivo

(57) ABSTRACT

A novel means of stability for a lifting platform utilizing toroidal vortex airflow through air guide means. A toroidal vortex created by the airflow means efficiently maintains a raised air pressure zone beneath the lifting platform or body. Airflow is directed downwards by means of air guides, which serve to produce lift and control rotational motion of the lifting platform to achieve stability of the body during operation. The system can also be easily modified to function as an attractor device. Overall, the present invention explores the uses of vortex airflow towards maintaining rotational stability.

19 Claims, 4 Drawing Sheets

LIFTING PLATFORM WITH POSITIVE HORIZONTAL STABILITY

CROSS REFERENCE TO OTHER APPLICATIONS

This application is filed as a continuation-in-part of co-pending application Ser. No. 09/728,602, filed Dec. 1, 2000, entitled "Lifting Platform" which is a continuation-in-part of copending application Ser. No. 09/316,318, filed May 21, 1999, entitled "Vortex Attractor."

TECHNICAL FIELD OF THE INVENTION

The present invention relates initially, and thus generally, to lifting platforms and techniques for improving the performance thereof. An example of a lifting platform is disclosed in applicant's co-pending application Ser. No. 09/728,602 entitled "Lifting Platform," the subject matter of which is herein incorporated by reference. Furthermore, the present invention relates to vortex flow and reference should be made to applicant's application Ser. No. 09/316, 318 entitled "Vortex Attractor," the specification of which is herein incorporated by reference. Particularly, the present invention discloses a new lifting platform arrangement which uses a toroidal vortex flow to provide positive rotational stability and overcome prior art limitations in the field of lifting platform stability.

BACKGROUND OF THE INVENTION

It is contemplated that the present invention could relate to many possible fields. Initially, it is thought that the invention could apply to fields including, but in no way limited to, hovercraft and other ground effect vehicles. Furthermore, the present invention may apply to fields such as vertical take-off and landing (VTOL) vehicles and turbine engines.

Additionally, the present invention relies upon background information pertaining to the inventor's teachings in the field of vortex attractors and generally, to vortex flow.

Ground Effect Vehicles

In the most conventional sense, the means for any type of levitation has been dominated by a single lift mechanism: the wing. The wing yielded a mode of travel that was a substantial improvement in many ways over other ground-based modes of travel. However, in some applications, wings have some important shortcomings.

Some important shortcomings will be enumerated below:
a) The velocity asymmetries around the surfaces of wings are the basis for the lift they generate. When wings move through the air, they produce substantial drops in pressure at their upper and lower surfaces. The forces generated on the upper and the lower surfaces of the wing, however, point in opposite directions so that they almost completely cancel out.
b) Because wings have low lift factors they have to be large in order to generate a practical amount of lift. The large size of the wings causes them to create a lot of drag when they move through the air.
c) Winged aircraft have a fairly narrow range of speed that they work well in. In order to get off the ground they must have a much larger wing than they need after they have gained speed. The large wing needed to take off creates a lot of drag at high velocity. That makes if very hard to fly at supersonic or hypersonic speeds. Importantly, in regard to the present invention, it makes them very difficult to generate lift at low speeds.
d) Wings have to be moved at fairly high velocity in order to produce practical amounts of lift. That means that they have a lot of room to operate and that winged aircraft are dangerous to bystanders. That is true even for rotary winged craft (helicopters).
e) Wings waste a lot of energy because they shed powerful vortices into the passing air as they generate lift. The energy that goes into those vortices contributes nothing to the generation of lift by the wing.
f) Wings can suddenly stop producing lift. If a winged aircraft flies too slowly the wings stall and can cause a crash.
g) Wings can't produce lift when they are standing still. To make a craft that can hover while it is standing still, means that the wings must be incorporated into a mechanism that swings them through the air. That mechanism and the wing together is called a rotary wing mechanism. It is very complicated and requires a lot of maintenance to operate reliably.
h) Rotary wing mechanism is inefficient.
i) Rotary wing craft are complicated and thus require a lot of maintenance.
j) The rotary wing mechanisms operate asymmetrically when a helicopter moves forward through the air. Without a corrective mechanism the helicopter produces greater lift on one side than the other side. The forward sweeping wings would experience a much higher air velocity than an aft sweeping wing. An elaborate hinge system is able to correct some of those air flow asymmetries at low speed. However, there is no corrective mechanism that allows a helicopter to operate at speeds faster than 250 m.p.h.

Thus, to address certain of these concerns, e.g., the ability to efficiently and cost-effectively hover and traverse at speeds safe to surrounding persons, various types or designs of ground effect or air cushion devices have been developed over the years. Ground effect crafts, or "hovercraft", are any of the machines characterized by movement in which a significant portion of the weight is supported by forces arising from air pressures developed around the craft, as a result of which they hover in close proximity to the Earth's surface. It is this proximity to the surface that chiefly distinguishes such craft from aircraft, which derive their lift from aerodynamic forces created by movement through the air.

Two main classes of air-cushion vehicles exist: those that generate their own pressure differential irrespective of forward speed; and those, more closely related to true aircraft, that require forward speed before the pressure differential can be generated. The former are classed as aerostatic craft (ACVs); the latter are called aerodynamic ground-effect machines (GEMs). Perhaps the first man to research the air-cushion vehicle concept was Sir John Thornycroft, a British engineer who, in the 1870s, began to build test models to check his theory that drag on a ship's hull could be reduced if the vessel were given a concave bottom in which air could be contained between hull and water. His patent of 1877 emphasized that "provided the air cushion could be carried along under the vehicle" the only power that the cushion would require would be that necessary to replace lost air. Neither Thornycroft nor other inventors in following decades succeeded in solving the cushion-containment problem. In the meantime, aviation developed and pilots early discovered that when they were flying very close to land or water surface their aircraft developed greater lift than in free air. Through research, it was soon determined that the greater lift was available because wing and ground together created a "funnel" effect, increasing the air pressure. The amount of additional pressure was found to be dependent on the design of the wing and its height above ground. The effect was strongest when the height was between one-half and one-third of the average wing chord.

Practical use was made of the ground effect in 1929 by the German Dornier Do X flying boat, which achieved a considerable gain in performance during an Atlantic crossing wherein it flew close to the sea surface. World War II maritime reconnaissance aircraft also made use of the phenomenon to extend their range.

In the 1960s, American aerodynamicists developed an experimental craft, making use of a wing in connection with ground effect. Several other proposals of this type were proffered, and a further variation combined the airfoil characteristics of a ground-effect machine with an air-cushion lift system that allowed the craft to develop its own hovering power while stationary, then build up forward speed, gradually transferring the lift component to its airfoil. Although none of these craft got beyond the experimental stage, they were important portents of the future because they suggested means of using the hovering advantage of the air-cushion vehicle and overcoming its theoretical speed limitation of around 200 miles per hour (320 kilometers per hour), above which it was difficult to hold the air cushion in place. These vehicles are known as ram-wing craft.

In the early 1950s, engineers in the United Kingdom, the United States, and Switzerland were seeking solutions to Sir John Thornycroft's 80-year-old problem. Christopher Cockerell of the United Kingdom is now acknowledged to have been the father of the Hovercraft, as the air-cushion vehicle is popularly known. During World War II he had been closely connected with the development of radar and other radio aids and had retired into peacetime life as a boatbuilder. Soon he began to concern himself with Thornycroft's problem of reducing the hydrodynamic drag on the hull of a boat with some kind of air lubrication.

Cockerell (later knighted) bypassed Thornycroft's plenum chamber (in effect, an empty box with an open bottom) principle, in which air is pumped directly into a cavity beneath the vessel, because of the difficulty in containing the cushion. He theorized that, if air were instead pumped under the vessel through a narrow slot running entirely around the circumference, the air would flow toward the center of the vessel, forming an external curtain that would effectively contain the cushion. This system is known as a peripheral jet. Once air has built up below the craft to a pressure equaling the craft weight, incoming air has nowhere to go but outward and experiences a sharp change of velocity on striking the surface. The momentum of the peripheral jet air keeps the cushion pressure and the ground clearance higher than it would be if air were pumped directly into a plenum chamber.

To test his theory, Cockerell set up an apparatus consisting of a blower that fed air into an inverted coffee tin through a hole in the base. The tin was suspended over the weighing pan of a pair of kitchen scales, and air blown into the tin forced the pan down against the mass of a number of weights. Hence, the forces involved were roughly measured. By securing a second tin within the first and directing air down through the space between, Cockerell was able to demonstrate that more than three times the number of weights could be raised by this means, compared with the plenum chamber effect of the single can.

Cockerell's first patent was filed on Dec. 12, 1955 (Great Britain Patent Application Ser. No. 35,656/55, and issued in the United States on Jan. 16, 1968 as U.S. Pat. No. 3,363,716 from Ser. No. 627,925, filed Dec. 12, 1956), and in the following year he formed a company known as Hovercraft Ltd. His early memoranda and reports show a prescient grasp of the problems involved in translating the theory into practice. Such problems still concerned designers of Hovercraft years later, and some of Cockerell's ideas have yet to be fully explored. He forecast, for example, that some kind of secondary suspension would be required in addition to the air cushion itself. Another of his ideas still to be developed deals with the recirculation of air in the peripheral jet so that part of it is used over and over, improving efficiency and reducing the power required.

Realizing that his discovery would not only make boats go faster but also would allow the development of amphibious craft, Cockerell approached the Ministry of Supply, the British government's defense-equipment procurement authority. The air-cushion vehicle was classified "secret" in November 1956, and a development contract was placed with a British aircraft and seaplane manufacturer. In 1959 the world's first practical ACV was launched. It was called the SR.N1. originally the SR.N1 had a total weight of four tons and could carry three men at a maximum speed of 25 knots (1 knot=1.15 miles or 1.85 kilometers per hour) over very calm water. Instead of having a completely solid structure to contain the cushion and peripheral jet, it incorporated a 6-inch- (15-centimeter-) deep skirt of rubberized fabric. This development provided a means whereby the air cushion could easily be contained despite unevenness of the ground or water. It was soon found that the skirt made it possible to revert once again to the plenum chamber as a cushion producer. Use of the skirt brought the problem of making skirts durable enough to withstand the friction wear produced at high speeds through water. It was thus necessary to develop the design and manufacturing skills that would allow skirts to be made in the optimum shape for aerodynamic efficiency.

Skirts of rubber and plastic mixtures, 4 feet deep, had been developed by early 1963, and the performance of the SR.N1 was increased by their use and further incorporating gas-turbine power to a payload of seven tons and a maximum speed of 50 knots.

The first crossing of the English Channel by the SR.N1 was in 1959, symbolically on the 50th anniversary of Louis Bleriot's first flight across the same water. Manufacturers and operators in many parts of the world became interested. Manufacture began in the United States, Japan, Sweden, and France; and in Britain additional British companies were building crafts in the early 1960s.

In 1963 the first major variation of the basic air-cushion vehicle theme was produced in the form of sidewall craft. This was a nonamphibious vessel that had a solid hull down each side, with a plenum chamber beneath the hull sealed by flexible skirts at the bow and stern. In the displacement mode, the central hull section floated in the water with the sidewalls well submerged, but when air was pumped into the plenum chamber, the hull was raised above the water and the sidewalls themselves were submerged for only some 12 inches (30 centimeters), considerably reducing the hydrodynamic drag.

The sidewall ACV has several advantages over the amphibious craft, although its use is confined to water: first, water propellers can be used, allowing a much greater freedom of control, especially at low speeds; second, the sidewalls themselves give the craft better stability and reduce the problems that are inherent in all-round flexible skirts. In the early 1970s, sidewalls were once again in favor, especially among American manufacturers who saw a market for a high-speed marine freight carrier that would not need an amphibious capability.

The years 1962–64 were a peak period for worldwide interest in Hovercraft, but by the early 1970s only the British had produced what could truly be called a range of craft, and this against considerable odds. There were signs, however, that U.S., Soviet, and French manufacturers were seriously contemplating reentry into the field and that Australia and Japan also were becoming ACV-minded.

The stagnation of the intervening seven years can be explained by the failure of air-cushion vehicles to live up to what many people thought was their original promise. Cockerell and others had foreseen many of the difficulties, but some second-generation designers, builders, and, particularly, operators thought that the simple Hovercraft would be the answer to a variety of problems that at that stage of development were considerably beyond the scope of the craft available.

In the first place, amphibious craft generally needed to be air-propelled. Directional control was imprecise, precluding their use on highways. As already mentioned, the design of and materials used in flexible skirts had to be developed from the first, and not until 1965 was an efficient and economic flexible-skirt arrangement evolved, and even then the materials were still being developed.

Another major problem arose when aircraft gas-turbine engines were used in a marine environment. Although such engines, suitably modified, had been installed in ships with some success, their transition into Hovercraft brought out their extreme vulnerability to saltwater corrosion. By its very nature the air-cushion vehicle generates a great deal of spray when it is hovering over water, and the spray is drawn into the intakes of gas turbines in amounts not envisaged by the engine designer. Even after considerable filtering, the moisture and salt content is high enough to corrode large modern gas-turbine engines to such an extent that they need a daily wash with pure water and even then have a considerably reduced life span between overhauls.

The costs of engine overhauls and skirt maintenance and repairs have probably been the main factors retarding the advancement of air-cushion vehicles. Skirt development proceeded extremely rapidly in the first decade after SR.N1. Jet-engine corrosion may be solved by new materials or possibly by intake design to limit spray ingestion. In the meantime, some manufacturers are bypassing the gas-turbine difficulty by using high-speed marine diesel engines in multiple units. These are cheaper, more economical to run, and relatively free from corrosion problems but for a given power output are considerably heavier than their gas-turbine counterparts.

The history of the air-cushion vehicle principle also includes the use of air-cushion support in other applications, both for transportation and for support as such. These include air-cushion transporters, trains, and even beds.

The basic elements of an air-cushion vehicle are a hull, beneath which a skirt system is attached and on which accommodation for passengers, crew, and freight is built; a propulsion system; and a lift system that feeds air into the plenum chamber below the craft in order to provide a cushion. The propulsion and lift systems can be driven by the same power plant or by separate units. If a common power plant is used, the system is known as an integrated lift-propulsion system. Some early craft had only one airflow generating system, which was used for both lift and propulsion, but optimum efficiency for both requirements was difficult to achieve simultaneously, and separate systems are generally used.

The power-to-weight ratio is as critical at the design stage of an ACV as it is in an aircraft. In the ACV it determines not only the payload and performance of the craft but also the ground clearance between the surface and the skirt. The greater the ground clearance, the more efficiently the propulsion forces available can be used. Theoretical design operating weights are essential for comparison and evaluation purposes, but in practice it has been found that air-cushion vehicles can be overloaded by as much as 100 percent of the design payload and still operate.

To obtain the best power-to-weight-to-strength relationships, structural fabrication of air-cushion vehicles has been based more on aviation than on marine practices. Hull structures are of marine aluminum skin, welded or riveted onto aluminum webs or frames. The enclosed spaces are usually sealed so that the airtight compartments thus formed provide natural buoyancy. More recent craft have aluminum honeycomb paneling separated by frames to provide the basic buoyancy raft, and considerable areas of glass-fiber structure also have been incorporated.

Early crafts had a hole located near the center of the buoyancy raft through which air was fed to the plenum chamber beneath, but the development of the skirt and other techniques led to the ducting of fan air to the edge of the raft, where it was fed downward into the plenum chamber in the manner of a peripheral jet.

Skirts themselves have developed from a simple curtain designed to enclose the cushion into complicated geometric shapes that contain the cushion, duct the air, and, in some cases, provide a degree of secondary suspension. The simple curtain was quickly replaced by what is now known as a bag skirt. In the shape of a semicircle, this is fastened around the perimeter of the craft; the lower edge is taken inward and upward and is fastened inboard, below the hull. The inflated skirt forms a semicircular cross section. If air is fed through ducts in the top hull so that it inflates the skirt and then is allowed to escape through holes on the inside edge of the bag into the plenum area, the skirt acts as natural ducting, and by varying the size of the holes it is possible to vary the pressure ratio of bag inflation to plenum pressure.

The problem with bag skirts is that the lowest part of the bag quickly wears away, and the bag itself tears, allowing air to escape and releasing the cushion pressure. In 1965 it was decided to lengthen the bag skirt by suspending a curtain-type skirt from it. Instead of a straightforward curtain arrangement, the skirt was split into small segments, each of which acted independently from the others. This segmented, or finger-type, addition to the basic bag skirt became the version most commonly used because worn segments could be replaced quickly and economically and because the independent action of each finger allowed the whole skirt to conform much more closely to the operating surface beneath, reducing drag and air-cushion losses.

Materials used in the skirts have varied from the original rubberized fabric, through pure rubber and nylon, to a lamination of nylon and a proprietary plastic known as neoprene. Bondings between the different layers have to be especially strong; otherwise the fabric delaminates under the severe conditions of wear and loses its tear resistance.

Power plants used for air-cushion vehicles are generally gas-turbine engines; the output shaft is driven by a turbine that is not mechanically connected to the main compressor-turbine assembly. In this way the engine can be independent of the fan or propeller that it drives, and the free turbine will not begin to rotate until gas from the engine is allowed to pass over its vanes. This allows the craft to remain stationary and on the ground until the driver decides to move, even though the engines are delivering power. The fans used to provide air pressure for lift are usually of the centrifugal type, in which air is fed in through the center and driven out at considerably higher pressure around the circumference. Propellers are generally similar to those used for aircraft, although, because the air-cushion vehicles travel in the 0–60-knot speed range and can move in reverse, a standard aircraft propeller designed to operate best at higher speeds is inefficient. Hovercraft propellers can be fixed or mounted on swiveling pylons, which allow the craft to be maneuvered quite accurately, independently of the rudders on which fixed propellers rely. Rudder effectiveness depends to some extent on the forward speed of the craft, and at very low speeds rudders are not efficient as a means of turning.

Other propulsion methods that have been tried in the past include ducted fans, which are quieter than normal propellers but tend to be large and cumbersome. Sidewall craft can be propelled by water screws or by water jets.

Operations on which air-cushion vehicles have been used have been largely confined to commercial passenger-carrying ferry services across stretches of water, varying between 3 and 25 miles (5 to 40 kilometers) wide, and to certain military operations. Although scheduled services have been run for experimental periods in the United States, Canada, Sweden, and Italy, it is only in Britain and France that such services have survived longer than a season. By the early 1970s, a 170-ton car-carrying craft was so well established on routes across the English Channel that a considerable amount of traffic was being taken from sea ferries, and air services were virtually closed down.

Nonpassenger civil applications also have been found. Craft have been successfully used for seismic survey parties, either over shallow-water areas or in the desert, and in search-and-rescue operations from international airfields at Vancouver, B.C., Can., at Auckland, N.Z., and at San Francisco.

Military uses have been more diverse. The main British use has been as a troop carrier during amphibious assaults and as a logistics follow-up craft during the post-assault period. The United States Army used the Hovercraft successfully in actual operations in Vietnam, both as a patrol craft and as a means of covering the vast area of marsh and paddy field that surrounds the Mekong delta. Later military uses included mine-countermeasure work, antisubmarine work, aircraft carrying, and missile launching.

The mainstream of Hovercraft development as such has remained in Britain. Although U.S. firms built experimental craft in the mid-1960s, American interest declined as the pressure of the Vietnam War tended to encourage technologists to improve their established disciplines rather than develop new ones. Other countries also dropped out when the technical difficulties of skirts and the lift-propulsion system became too great for the financial or technical resources available.

The three British companies that pioneered ACV manufacturing merged their ACV interests in the 1960s into one company known as the British Hovercraft Corporation.

Cockerell's patent and other patents were taken up by a subsidiary of the National Research Development Corporation, a peculiarly British body set up to encourage the funding and backing of inventions. The subsidiary was known as Hovercraft Development Ltd., and, because of the patents that it held, it could control the manufacture of skirted air-cushion vehicles not only in Britain but in many other countries of the world.

The lineage along which ACVs developed was:

SR.N1 (1959) 3½ to 7 tons, single engine, ducted fan propulsion; speeds between 25 and 50 knots.

SR.N2 (1962) 19 tons, four engines driving two pylon-mounted air propellers; speed about 73 knots.

SR.N3 (1963) 37½ tons, four engines driving two pylon-mounted air propellers; speed about 75 knots.

SR.N5 (1964) 3½ tons, one engine driving a fixed, variable-pitch propeller; speed about 50 knots. Capacity, 18 passengers.

SR.N6 (1965) 4½ tons, one engine driving a fixed, variable-pitch propeller; speed about 60 knots. Capacity, 38 passengers.

SR.N4 (1968) 177 tons, four engines driving four pylon-mounted air propellers; speed 65 knots. Capacity, 30 cars and 254 passengers.

BH.7 (1969) 48 tons, one engine driving a pylon-mounted air propeller; speed about 65 knots. Capacity, 72 passengers and six cars (although the first three craft delivered were purely military versions).

These somewhat bare statistics suggest the burst of creative energy in the Hovercraft field in the early 1960s and the subsequent slowing down and rationalization of craft into practical machines. In the period between 1960 and 1964, some six other companies in the world also were building their own prototypes or large-scale models, but because of technology problems many of these were never followed up by production models.

The exceptions were in the Soviet Union and France. Little, however, is known about Soviet ACV development, except that after some five years of trials large passenger craft were operated on the Volga River in 1969 and that military craft were tested in the Black Sea in 1970.

A French company, formed in 1965, built two amphibious craft that, carrying up to 90 passengers, operated a commercial service based at Nice in 1969. The French designs are basically the same as any other amphibious craft with the major exception of the skirts, which are grouped together in a series of "mini-skirts" side-by-side along the length of the craft. Compartmentalizing the cushion in this way is said to improve stability and directional control. In the early 1970s it was announced that a larger craft, based on similar principles and carrying 32 cars and 260 passengers, would be put into production.

The development of nonamphibious Hovercraft along the sidewall principle began in 1962. For various reasons the manufacturer halted production, but the idea of a fast, essentially marine-oriented craft continued to appeal to designers, and a company known as Hovermarine was formed in 1965 to build a smaller sidewall craft, some 12 of which were sold. This is the HM.2, which carries about 65 passengers and is designed for short and medium ferry routes. Mechanical and skirt-design problems caused difficulties that led to liquidation of the British parent company, but in 1970 an American company took over the HM.2, and it appeared that its future would be assured. The basic advantage of sidewall craft is that, since they are purely marine, it is possible to equip them with marine propellers and operate them in the same way as high-speed boats. Nevertheless, because a great part of their weight when under way is supported by an air cushion, they can be classified as air-cushion machines.

It is along these lines (sidewall craft propelled by marine methods) that two American manufacturers have designed much larger craft under government contracts. The first versions are 100-ton test craft, which will be used to evaluate the potential of multithousand-ton surface effect ships. The two models are somewhat similar in appearance; both are powered by six gas to turbines. One craft uses propellers, the other water-jet propulsion. Another U.S. military application, an amphibious assault landing craft for the navy, offers potential uses in commercial operations.

Once air-cushion suspension was proved practical in Hovercraft, the system was quickly applied to other forms of transport, and it soon became clear that a tracked vehicle, similar to a train or monorail, would benefit considerably from the lack of friction inherent in an air-cushion system. A French company was the first in the world to produce a practical device, and a later version of its machine was considered for a high-speed link between Orleans and Paris by the mid-1970s. The system used air-cushion pads above and at the side of a single concrete track to support the "aerotrain," while propulsion was via a large ducted fan mounted at the rear.

In Britain, tracked air-cushion vehicle development is also under way, with construction of a "Hovertrain," propelled by a relatively silent linear induction motor that has no moving parts and picks up current as it moves along the track.

Research also is proceeding in other countries. Air-cushion trains have speed potentials of up to 300 miles (480 kilometers) per hour; track costs are relatively low because of the simple concrete structure involved, which can be elevated on pylons, laid on the surface, or sunk in tunnels. Engineers in Britain, the United States, France, and Germany see this kind of high-speed surface transport as a means of connecting large urban centers with each other and with international airports.

The other major area in which air-cushion technology has proved itself useful is in moving loads over surfaces that would be impossible for wheeled or tracked vehicles. One of the first of these applications was an air-cushion amphibious military vehicle. Another example was an air-cushion truck built in France. Air-cushion load lifters for specialized applications were already in regular use in the early 1970s. One of the first was a British heavy-load carrier, designed specifically for the transport of large electrical transformers over bridges that were not stressed for the weights involved when normal wheeled transport was used. The transformers, weighing up to 300 tons, must be transported by road from the factory to the often remote power-station site. The costs of strengthening bridges sufficiently to take the load are far higher than those of fitting a special skirt and air-blower system to a conventional truck.

Similar systems on smaller scales have been developed for transport of many types of unusual loads over awkward ground. Particularly, they find application in the Arctic regions, where roads are often lacking and where oil-drill rigs are being constructed or where surveying is being carried out. Air-cushion vehicles have shown a large economic advantage over helicopters.

On an even smaller scale, air-cushion pallets are used in many industries in the United States and Britain to carry heavy loads across factory floors or along production lines. Again the main benefit is the reducing of strain on floors and the ease of propulsion with reduced friction.

One unique form of air suspension may be employed in hospitals. The Hover-bed is a device on which a patient is supported with the minimum of body contact and surface pressure. The bed is being tested by the British Medical Research Council and is expected to be of particular use in cases in which the patient is burned over a large area of the body. Air support in such cases not only relieves pressure and pain but also provides a film of sterile air that actually helps to heal the wound.

Yet another application promises to be that of recreation. In the mid-1960s enthusiasts in many parts of the world began to build their own Hovercraft, powered by automotive engines and using homemade propellers, fans, and skirts. By the 1970s Hover clubs existed in more than seven countries. The movement is probably most active in Britain, followed by the United States and Australia. Of the several hundred amateur-built craft, a few were capable of operating successfully over both land and water with more than one person aboard. Although power plants and other equipment are readily adaptable, the problem of providing sufficient lift was considerable. A craft capable of lifting 200 pounds (90 kilograms) needs a cushion area of 8×4 feet (2.4×1.2 meters). When weights of 1,000 pounds are involved, the area must be much greater. Another inhibiting factor in the sport's growth is the restrictions in most countries on operating air-cushion craft in public areas.

Air-cushion vehicles have not yet fulfilled their original promise. Conventional skirted craft have not yet been shown to be completely economical in commercial use, although in certain military applications they are almost ideal. The ram-wing craft described earlier shows promise for over-water routes.

One area of research in which manufacturers began concentrating in the 1970s is that of secondary suspension systems to iron out skirt undulations and possibly reduce spray ingestion.

Despite ongoing gradual improvements in the field of hovercraft design, primary focus has historically been on increasing lift efficiency and skirt durability. While advancements have been made involving such features (most notably of which is the applicant's previously mentioned "Lifting Platform" application which drastically increases hovercraft lift efficiency and completely eliminates the requirement for a skirt), very little attention has been given to hovercraft stability. However, stability remains an important issue to successful hovercraft design since prior art designs are plagued by negative stability that leads to a rolling action, making not only the transport uncomfortable but the hovercraft prone to frequent damage. Nevertheless, those of skill in the art would likely agree that until efficiency and durability requirements regarding hovercraft design are met, the widespread use of hovercraft will remain limited. Prior to the inventor's contributions to the art, the desired efficiency and durability in hovercraft design had not been achieved. Thus, previously considered an ancillary feature, hovercraft stability has not yet sufficiently been considered.

Thus, there is a need for an improved hovercraft. In particular, there exists a need for a durable hovercraft with such an airflow system that provides improved stability without undesired frequent rolling.

SURVEY OF THE PRIOR DISCLOSURES

The prior art is devoid of simple, effective ways of stabilizing a lifting platform. Particularly, nowhere does the prior art disclose the use of a toroidal vortex to those ends. Nonetheless, the following represent references considered by the inventor to be the most relevant. One skilled in the art can plainly see that even these do not approach the scope of the present invention.

Crewe U.S. Pat. No. 3,968,852 (the '852 patent) discloses stabilizing means for air cushion vehicles. Crewe teaches stabilizing means which improve the pitch and roll characteristics of an air cushion vehicle, wherein at least one stabilizing device comprising first and second members attaches to the bottom of the vehicle and pressurized air from a source on the vehicle passes downwardly between the members. Such a process results in the formation of an air curtain which builds up and maintains a localized cushion of pressurized air within the stabilizing device. The '852 patent, however, essentially discloses an alternate form of a flexible skirt design and therefore, the stabilizing means of the '852 patent are prone to the same high maintenance and expense characteristics of the skirt designs.

Stiegler et al. U.S. Pat. No. 5,520,261 (the '261 patent) discloses a static trimmer designed for a hovercraft. This invention allows the shifting of the center of buoyancy of an air cushion of a hovercraft in relation to the center of gravity using an elastic skirt design. The '261 patent includes a peripheral elastic skirt having a plurality of segements, each with a back skirt and a finger skirt. Furthermore, the peripheral elastic skirt also includes four independent lateral sections which can independently be moved inward or outward. Additionally, tension cables are included in each independent lateral section, further comprising first and second partial tension cables, for moving each finger skirt of each skirt segment. As with other skirt designs, however, the '261 patent is prone to high maintenance and expenses due to the nature of the skirt being placed against the surface.

Vickers et al. U.S. Pat. No. 5,931,248 (the '248 patent) discloses a durable roll-stabilizing keel system which is to be attached to a hovercraft's hull. This system comprises dual trough-shaped bladders, wherein the second trough-shaped bladder is attached to the underside of the forward portion of the first. A plurality of additional shaped bladders are attached in succession to the first trough-shaped bladder immediately after the second trough-shaped bladder. The plurality of shaped bladders further comprise a rectangular base portion attached to the underside of the first trough-shaped bladder, with an inflation hole in between, and tapers to an apex. Each shaped bladder section is referred to as a cone section, and these cone sections are placed parallel to the direction of the hovercraft motion in order to resist buckling forces caused by craft motion. The novelty of the '248 patent purportedly lies in the use of a plurality of cone sections for increased roll-stability of a hovercraft whereupon the damaging of one cone section does not propagate along the length of the keel and the craft can still remain effective. While the '248 patent may achieve roll-stability and effective operation with isolated point of failure, reducing the cost of replacing an entire keel or a bladder upon each occurrence of any damage, the '248 patent is still based upon a design which is susceptible to frequent damage due to its low proximity to the surface and thus, individual sections must be frequently replaced. The present invention discloses means for hovering without the requirement of a keel and/or bladder and thus, does not result in frequent replacement of any components, reducing operation costs and time of inactivity during which time replacement of components occurs.

Gastesi U.S. Pat. No. 5,941,331 (the '331 patent) discloses an air cushion vehicle control system. Control of an air cushion vehicle is obtained by controlling the translation of the vehicle independently from control of the rotation. However, the '331 patent does not provide for balancing means whereupon an air cushion vehicle may maintain its stability when it travels over uneven surfaces, such as a large bump. Furthermore, the '331 patent relies on a skirt to maintain hover which is highly undesirable due to the expensive characteristic of frequent replacement of the skirt upon contact with rough surfaces.

Thus, the prior art suggests a strong need for a versatile, efficient, stable lifting platform. Further, there exists a need for hovercraft stability means which do not require a skirt or related components which are prone to frequent and costly repair due to damage incurred resulting from direct exposure to the ground.

SUMMARY OF THE INVENTION

Lifting platforms are generally associated with hovercraft in which a high pressure area beneath the vehicle maintained either by a skirt or by dynamic air flow, lift the vehicle a small distance above the operating surface. The lifting system of the present invention employs a unique method of lift generation and control wherein automatic balance correction is maintained throughout operation and the requirement for a skirt is eliminated. The lifting system described herein may be extended to flight at altitude and in an extreme case allows the vehicle to fly upward and then change its operation to that of a vortex attractor. Furthermore, the device may comprise lateral movement capabilities in both lift mode and vortex attractor mode. What follows is a brief survey of the present invention's applicability to several possible fields.

In the field of hovercraft, the present invention finds use in embodiments that require positive stability upon experiencing rolling forces during operation. In an embodiment of the present invention, a hollow skirt is proposed such that airflow is directed through airguides located around the perimeter of the craft's body with a static pressure region maintained underneath the body providing a toroidal vortex. The present invention employs air guides on the perimeter of a body wherein the airflow source is located above the body. The body's center of gravity is, under normal conditions, aligned with the center of pressure below. During operation, the device is frequently subject to rotational forces from sources such as uneven ground surfaces or obstructions, air turbulence, or forces resulting from the device's own momentum. Upon exposure to such a rotational force, the device lifts to one side. In prior art devices, upon experiencing such a rotational force a rolling motion begins as the device lifts from one side to the other and becomes unstable (as will be explained infra). The new lifting platform arrangement of the present invention, however, moves the center of pressure during a roll towards the side opposite the lifting side and in such a manner, provides automatic roll correction.

Furthermore, the present invention may find particular use in the field of vertical take-off and landing (VTOL) vehicles and specifically turbine engines. For example, a turbine engine utilizing a double shroud system as described previously by the inventor would be very useful when combined with the teachings of the present invention. An engine such as this, coupled with the stability means of the present invention, would yield a turbine engine which not only operates efficiently but remains stable and easily controllable particularly when close to the ground. Likewise, a VTOL craft such as a helicopter would greatly benefit from the teachings of the present invention. An inclusion of the present invention onto a helicopter or related device would provide excellent means for stable take-offs and landings. Also, hovering at close distances to the ground could be made more safe thereby preventing crashes due to operator inaccuracies.

The difference between the new lifting platform and prior art lies in the increased area for downward moving air and the inclusion of air guides to maximize both the amount of direct dynamic lift from the airflow and also the static pressure achieved beneath the craft. The new platform design disclosed comprises positive horizontal stability which leads to a highly desired automatic correction of balance when an outside force acts upon it to cause a tilting motion. Prior designs comprise negative horizontal stability which leads to a rolling action which may damage air pressure containing skirts.

Thus, it is an object of the present invention to provide an improved lifting platform.

Further, it is an object of the present invention to provide an improved lifting platform that utilizes a variety of drives.

It is another object of the invention to provide an improved hollow skirt for a hovercraft.

It is a further object of the present invention to provide a hovering platform with automatic balance correction when the platform is tilted in any direction.

It is still a further object of the present invention to provide a hovering platform which maintains automatic balance correction when the platform is tilted in any direction and does not require a skirt.

SUMMARY OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Figure 1:
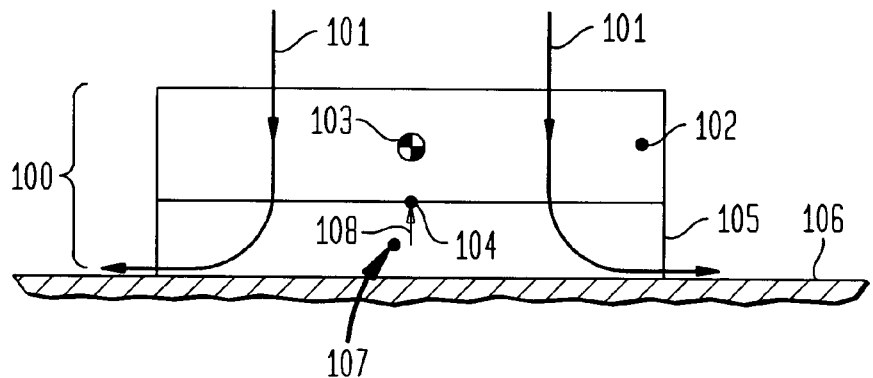
FIG. 1 (PRIOR ART) shows a cross section of a plenum chamber hovercraft with static skirt.

Referring first to FIG. 1, depicted is a cross section of a prior art common plenum chamber hovercraft 100. During operation, airflow 101, which may be produced by one or more variety of sources, travels through body 102 and enters a central static pressure region 107 where it is maintained at high pressure by wraparound skirt 105. Airflow 101 escapes sideways through the area between skirt 105 and surface 106 and is continually replaced by air pumped from the source of airflow 101. As a result of this procedure, airflow 101 replaces the air lost underneath the skirt edges and maintains the high pressure under the body to maintain positioning of hovercraft 100 slightly above surface 106, achieving a desired hovering status. During the course of operation, center of gravity 103 remains in the center of body 102 above center of pressure 104, indicated in this case by pressure vector 108, while body 102 remains parallel to surface 106. In an ideal setting, wherein surface 106 remains flat and hovercraft 100 does not receive any significant forces which may cause tilting, the embodiment of FIG. 1 may achieve a suitable hovering status. However, in practice, tilting of hovercraft 100 often occurs during the course of operation.

Figure 2:
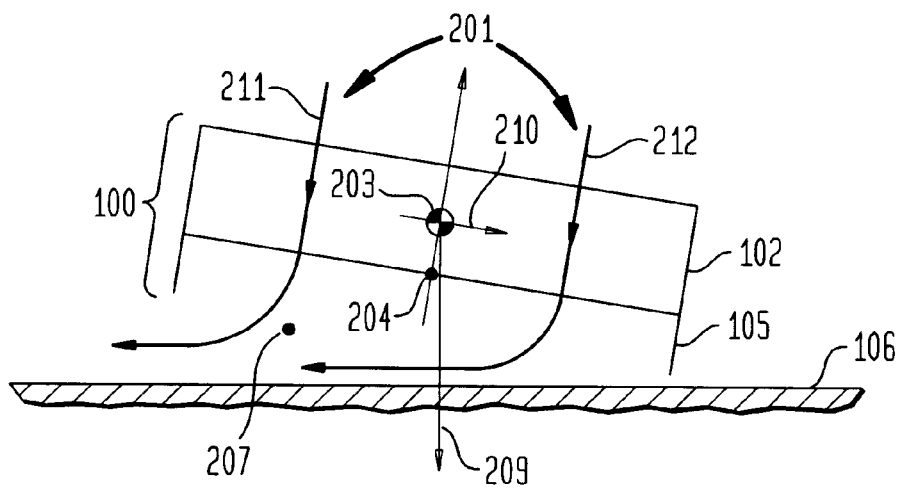
FIG. 2 (PRIOR ART) shows a cross section of a plenum chamber hovercraft with static skirt, with left side lifting.

Referring next to FIG. 2, shown is a cross section of common plenum chamber hovercraft of FIG. 1, wherein hovercraft 100 tilts to the side. As shown, the left side of hovercraft 100 is lifted with the rightmost point of contact between skirt 105 and surface 106 serving as the point of the pivot. Airflow 201 travels through body 102 and due to the lifting of the left side of hovercraft 100, a larger portion 211 of airflow 201 is quickly directed to the left side as a result of the larger gap created between the left side of skirt 105 and surface 106. A smaller portion 212 of airflow 201 may also be directed to the right side through any remaining gap between the right side of skirt 105 and surface 106. As central pressure region 207 leaves the left side of hovercraft 100, pressure vector 208 collapses back to pressure vector 108 of FIG. 1. Hovercraft then 100 rotates counterclockwise around the bottom of the right side of skirt 105 until the left side of said skirt 105 hits surface 106 and a seal is restored around central pressure region 207, leaving hovercraft 100 in its original position of FIG. 1.

In many cases, after moving from its position of FIG. 2 back to its original position of FIG. 1, the rotating inertia of the counter-clockwise motion of hovercraft 100 will carry the right side of skirt 105 off surface 106. The reverse motion of the description for FIG. 2 then occurs. For example, when the left side of skirt 105 is off surface 106, and before central pressure region 207 within skirt 105 has had time to flow away to the left, resultant vector 210 (the summation of pressure vector 208 and weight vector 209) points generally to the right. Resultant vector 210 then produces a turning moment around the bottom of the right side of skirt 105, which tends to raise the left side of said skirt 105 even further. Once a rolling motion begins, it is exacerbated by the resulting turning moment. Hovercraft 100 may then become unstable in such a way that once a roll has started, it may continue from side to side without end. In addition to the undesirability of this rolling motion, a hovercraft of this design results in heavy wear and damage to skirt 105.

Figure 3:
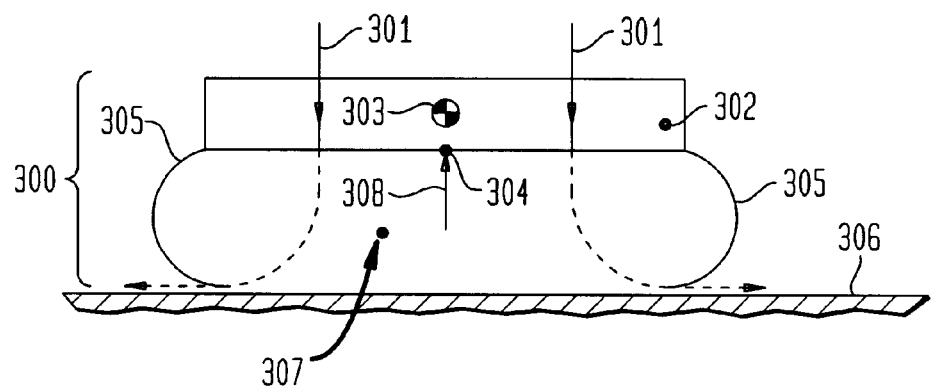
FIG. 3 (PRIOR ART) shows a cross section of a hovercraft with flexible skirt.
Figure 4:
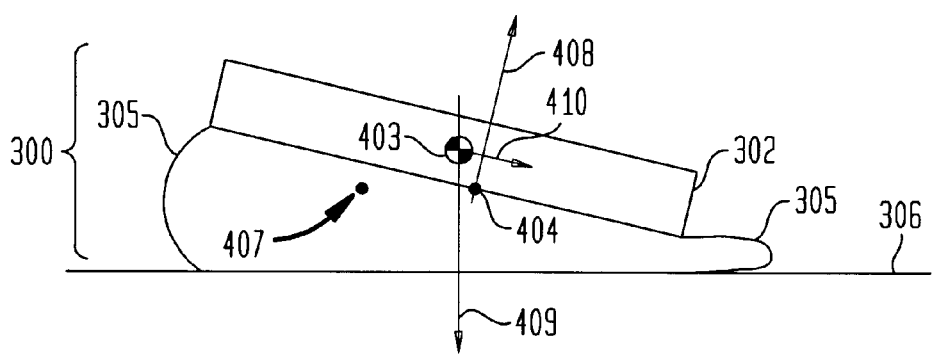
FIG. 4 (PRIOR ART) shows a cross section of a hovercraft with flexible skirt, with left side lifting.

Referring next to FIGS. 3 and 4, shown is an alternative to the hovercraft of FIGS. 1 and 2 wherein hovercraft 300 comprises flexible skirt 305. Hovercraft 300 functions in a manner similar to FIGS. 1 and 2 with airflow 301 passing downward through body 302 and outward to the sides between skirt 305 and surface 306 to provide a downward force to result in body 302 maintaining hover above surface 306. However, with flexible skirt 305 hovercraft 300 more successfully seals static pressure region 307 and reduces the amount of air required to maintain hovering of body 302. The center of pressure is noted as 304, and the pressure vector as 308. FIG. 4 shows the effect of a lift of the left side of hovercraft 300 wherein the right side of skirt 305 flattens out. As a result of the characteristics of flexible skirt 305, the center 404 of static pressure region 407 moves to the right upon a lift shown in FIG. 4 to generate a restoring counter-clockwise turning moment. This moment is due to the resultant vector 410 encompassing weight vector 409 and pressure vector 408. The main drawback to this design lies in the maintenance and frequent replacement cost of the flexible skirts.

Referring now to FIGS. 5, 5A, 6 and 6A, shown are embodiments of the present invention which overcome shortcomings of the prior systems thus enhancing stability, with corresponding pressure distribution characteristics. As FIG. 5 indicates, airflow 501 travels downward through air guides 510 and 511 with velocity V and exits to the left or right of bottoms of said air guides 510 and 511, respectively, with radius of curvature Ro. Air guides 510 and 511 have vertically oriented flow straightening vanes (not shown) in order to eliminate the possibility of a rotational component of airflow beneath the platform that would result in a reduced air pressure. This process yields high static pressure region 507 below body 502 which provides a lift such that hovercraft 500 maintains hover above surface 506. Center of gravity 503 is located at the center of body 502. Pressure vector 508 is directed upwards from surface 506, pointing towards center of pressure 504 which is located at the bottom of body 502 directly below center of gravity 503. Airflow 501 may be produced by a variety of sources such as a propeller, centrifugal pump or jet engine. Furthermore, airflow 501 passing through air guides 510 and 511 may be produced by the same source or by two separate sources, wherein separate sources may correspond to each of said air guides 510 and 511. The pressure difference from the outside hovercraft 500 to static pressure region 507 is given by the formula P=$\rho V^2$/R, where P is the pressure difference, $\rho$ is the air density and R is the radius of curvature.

Figure 5:
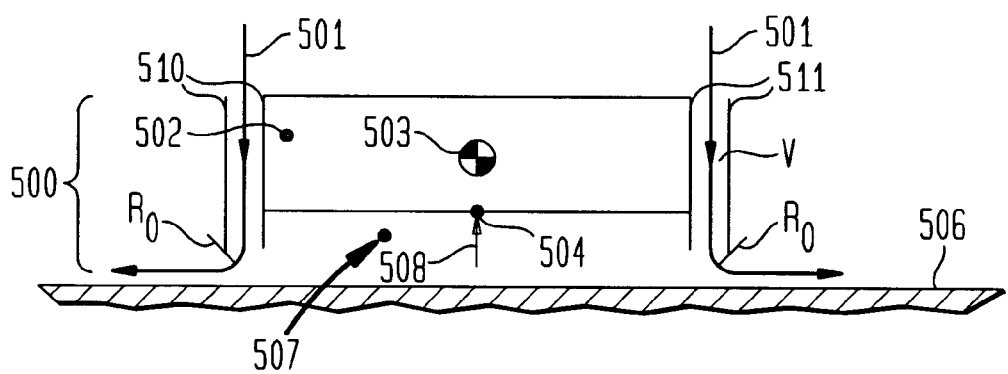
FIG. 5 shows a cross section of a hovercraft of the present invention.
Figure 5A:
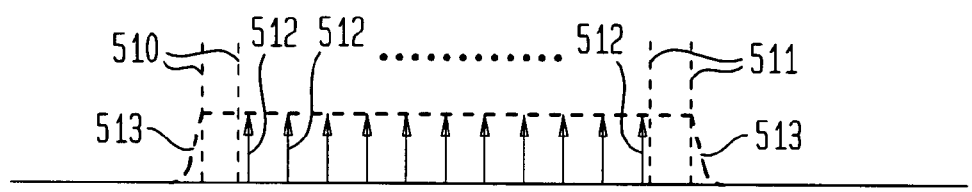
FIG. 5A shows the distribution of pressure under the body of a hovercraft of FIG. 5.

FIG. 5A shows the pressure distribution under body 500, which is constant across the entire area and including the area below air guides 510 and 511, indicated by pressure vectors 512. Immediately outside air guides 510 and 511 the pressure drops down to atmospheric as shown by average pressure curve 513.

Figure 6:
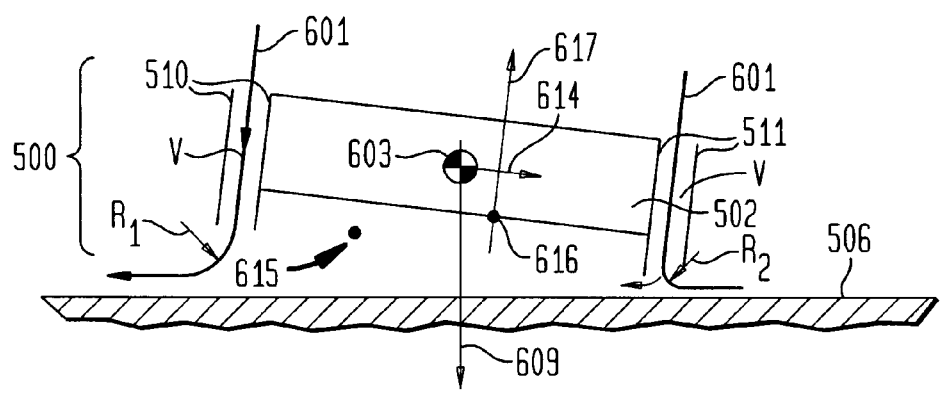
FIG. 6 shows a cross section of a hovercraft of the present invention, with left side lifting.
Figure 6A:
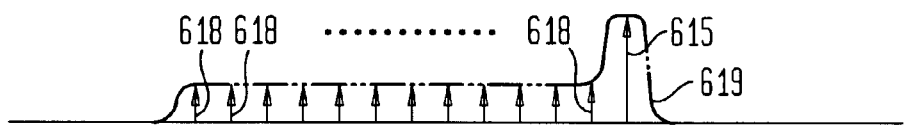
FIG. 6A shows the distribution of pressure under the body of a hovercraft of FIG. 6.

FIG. 6 depicts hovercraft 500 when body 502 is tilted to the right. Airflow 501 travels downward through air guides 510 and 511 at approximately constant velocity V. As before, static pressure region 615 is formed between the bottom of body 502 and surface 506 and center of gravity 603 remains at the center of body 502. Weight vector 609 is directed straight downwards from center of gravity 603, perpendicular to surface 506. Pressure vector 617 points upwards from center of pressure 616, perpendicular to the bottom surface of body 502. Weight vector 609 may be resolved into two components, one, not shown, acts perpendicular to the bottom of body 502, and the other, 614 parallel to body 502. Vector 614 is shown exaggerated in length for clarity. When body 502 remains parallel to surface 506 resultant vector 617 acts vertically, opposed by weight vector 609 and vector 614 has zero magnitude. However, when body 502 is tilted, vector 614 increases in value and produces a clockwise turning moment around the bottom right hand corner. The raised left side of hovercraft 500 results in the radius of curvature on the left side of hovercraft 500 increasing from Ro of FIG. 5A to R1 and the radius of curvature on the right side of hovercraft 500 decreasing from Ro of FIG. 5A to R2. Thus, $\rho V^2$/R1 is less than P=$\rho V2$/Ro and the pressure beneath air guide 510 and beneath body 502 is reduced from that of FIG. 5 as shown by pressure vectors 618 in FIG. 6A. On the right side of hovercraft 500, radius of curvature R2 is less than Ro, and therefore $\rho V^2$/R2 is greater than $\rho V^2$/Ro. Thus, the pressure beneath air guide 510 increases, as indicated by pressure vector 617 and average pressure curve 619 in FIG. 6A. Therefore, tilting hovercraft 500 clockwise (or lifting left side of hovercraft 500) results in the movement of center of pressure 504 of FIG. 5 to the right as indicated by center of pressure 616 of FIG. 6, and thus, the shifting of pressure vector 508 of FIG. 5 rightward as indicated by pressure vector 617 of FIG. 6 in parallel with hovercraft 500. The opposite is also true. That is, tilting hovercraft 500 counter-clockwise results in the movement of center of pressure 504 and pressure vector 508 of FIG. 5 to the left. The sideways displacement of center of pressure 504 of FIG. 5, from center of gravity 503, to center of pressure 616 of FIG. 6 leads to a counter-clockwise turning moment due to the sideways displacement of pressure vector 617. The sideways displacement of pressure vector 617 from weight vector 609 produces a counter clockwise turning moment that is greater than the clockwise turning moment produced by vector 614. This acts to correct the roll or tilt. This effect is similar to the case of a rolling ship for which the center of buoyancy moves towards the lower side. Thus, stability criteria for ships may be adapted to apply to lifting platforms such as that of the present invention.

The downward air speed in the air guides should be maintained around the periphery of the craft. In practice, however, the downward airspeed in the air guides will not remain constant but will vary somewhat with the back pressure, P=$\rho V^2$/R, and the differences must be taken into account when calculating stability.

Reducing the area of airflow within air guides 510 and 511 reduces the amount of roll correction, and positive stability may not be achieved as appears to be the case for hovercraft with double skirts which are known to lack stability. The novelty of the present invention lies in the increased area for downward moving air and the inclusion of air guides 510 and 511 to maximize both the amount of direct dynamic lift from airflow 501 and also static pressure 507 achieved beneath hovercraft 500.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A lifting platform having automatic roll correction comprising:
   toroidal vortex fluid flow generation means wherein the speed of said toroidal vortex fluid flow is constant along the periphery of said lifting platform;

and further wherein said toroidal vortex fluid flow comprises substantially no rotational component;

and further wherein said toroidal vortex fluid flow generates pressure differentials along the periphery of said lifting platform effecting a high pressure region between said lifting platform and said surface wherein the magnitude of said pressure differentials are inversely proportional to the radii of curvature of said toroidal vortex;

and further wherein when said lifting platform is nonparallel to said surface, the center of pressure of said high pressure region shifts to stabilize said lifting platform.

2. A lifting platform in accordance with claim 1 wherein said toroidal vortex fluid flow generation means comprises an impeller.

3. A lifting platform in accordance with claim 1 wherein said toroidal vortex fluid flow generation means comprises a propeller.

4. A lifting platform in accordance with claim 1 wherein said toroidal vortex fluid flow generation means comprises a gas turbine engine.

5. A lifting platform in accordance with claim 1 wherein said toroidal vortex fluid flow generation means comprises a centrifugal pump.

6. A lifting platform in accordance with claim 1 wherein said toroidal vortex fluid flow generation means comprises fluid guides circumferentially surrounding said lifting platform.

7. A lifting platform in accordance with claim 6 wherein said fluid guides are cylindrically shaped.

8. A lifting platform in accordance with claim 1 wherein said toroidal vortex fluid flow generation means comprises flow straightening means.

9. A lifting platform in accordance with claim 8 wherein said flow straightening means comprises flow straightening vanes.

10. A lifting platform having automatic roll correction comprising:

fluid guides;

fluid flow means for generating a fluid flow through said fluid guides such that the speed of fluid flow is substantially constant along the periphery of said lifting platform; and flow straightening means, wherein said flow straightening means eliminate the rotational component of said fluid flow;

wherein upon exiting said fluid guides, said fluid flow forms a toroidal vortex radii of curvature located proximally along said periphery of said lifting platform;

and further wherein said toroidal vortex creates pressure differentials along the periphery of said lifting platform that maintain a high pressure region between said lifting platform and said surface such that said lifting platform maintains a distance from said surface;

and further wherein said pressure differentials are inversely proportional to said radii of curvature;

and further wherein when said lifting platform is nonparallel relative to said surface, said radii of curvature of said toroidal vortex are altered, thereby altering said pressure differential along the periphery of said lifting platform such that the center of pressure of said high pressure region is shifted such that said lifting platform is stabilized.

11. A lifting platform in accordance with claim 10 wherein said fluid flow means comprises an impeller.

12. A lifting platform in accordance with claim 10 wherein said fluid flow means comprises a propeller.

13. A lifting platform in accordance with claim 10 wherein said fluid flow means comprises a gas turbine engine.

14. A lifting platform in accordance with claim 10 wherein said fluid flow means comprises a centrifugal pump.

15. A lifting platform in accordance with claim 10 wherein said fluid guides circumferentially surround said lifting platform.

16. A lifting platform in accordance with claim 10 wherein said fluid guides are cylindrically shaped.

17. A lifting platform in accordance with claim 10 wherein said flow straightening means comprises flow straightening vanes.

18. A method for providing roll correction for an apparatus which maintains a distance from a surface comprising the steps of:

generating a fluid flow;

eliminating the rotational component of said fluid flow; and guiding said fluid flow into a toroidal vortex having radii of curvature located proximally along the periphery of said apparatus such that said toroidal vortex creates pressure differentials along the periphery of said apparatus effecting a high pressure region between said apparatus and said surface;

wherein said pressure differentials are inversely proportional to said radii of curvature;

and further wherein the speed of said fluid flow is constant along the periphery of said apparatus;

and further wherein when said apparatus is nonparallel relative to said surface, the radii of curvature of said toroidal vortex alter, thereby stabilizing said apparatus.

19. A method according to claim 18 wherein the altering of said radii of said toroidal vortex shifts the center of pressure of said high pressure region.

* * * * *